(12) United States Patent
Zhang

(10) Patent No.: US 12,524,157 B2
(45) Date of Patent: Jan. 13, 2026

(54) STRUCTURED DATA FILTERING IN MEMORY DEVICES

(71) Applicant: SK Hynix NAND Product Solutions Corp., Rancho Cordova, CA (US)

(72) Inventor: Xuzheng Zhang, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/513,198

(22) Filed: Nov. 17, 2023

(65) Prior Publication Data

US 2025/0165149 A1    May 22, 2025

(51) Int. Cl.
*G06F 3/06* (2006.01)
*G06F 16/22* (2019.01)

(52) U.S. Cl.
CPC .......... *G06F 3/0613* (2013.01); *G06F 3/0659* (2013.01); *G06F 3/0679* (2013.01); *G06F 16/2237* (2019.01)

(58) Field of Classification Search
CPC .... G06F 3/0613; G06F 3/0659; G06F 3/0679; G06F 16/2237
See application file for complete search history.

(56) References Cited

U.S. PATENT DOCUMENTS 8,972,337 B1    3/2015  Gupta
12,117,986 B1*  10/2024 Veselova ............. G06F 16/2246
2016/0147806 A1  5/2016  Blanco et al.
2018/0121504 A1  5/2018  Bienert et al.
2019/0129999 A1  5/2019  Baggett et al.
2024/0069787 A1* 2/2024  Kannan ................. G06F 3/0661

FOREIGN PATENT DOCUMENTS

CN         105938457 A     9/2016

OTHER PUBLICATIONS

SK Hynix NAND Product Solutions Corp. (dba Solidigm), PCT/US2024/055999, International Search Report and Written Opinion, Feb. 28, 2025, 10 pgs.

* cited by examiner

*Primary Examiner* — Hosain T Alam
*Assistant Examiner* — Subir Kumar Chowdhury
(74) *Attorney, Agent, or Firm* — Morgan, Lewis & Bockius LLP

(57) ABSTRACT

This application is directed to reading data from a memory device by structured data filtering within the memory device. The memory device is coupled into a host device and includes a plurality of memory blocks. The memory device receives, from the host device, a read request for data in a data structure including a plurality of data records. The read request comprises a bitmap identifying a subset of data records in the plurality of data records. Based on the read request, the memory device reads data from the plurality of memory blocks. The read data is filtered based on the bitmap to generate filtered data. The memory device returns the filtered data to the host device in response to the read request.

20 Claims, 10 Drawing Sheets

```
{"name": "trade_table",
 "columns" :[
   {"name": "symbol", "size": 20, "start lba": 100, "length": 3300 },
   {"name": "timestamp", "size": 8 , "start lba": xx, "length": yy},
   {"name": "shares", "size": 4 , "start lba": 9000, "length": 1000},
   {"name": "cost", "size": 4, "start lba": 15000, "length": 1000}
 ]
}
```

At a memory device: — 810

Receive, from a host device coupled to the memory device, a read request for data in a data structure that includes a plurality of data records.

811 — The read request comprises a bitmap identifying a subset of data records in the plurality of data records.

812 — The read request further comprises at least one of: a starting read location with respect to logical block addressing (LBA); a length of LBA; a size of page head; or a size of data record.

813 — The bitmap is generated based on a query comprising at least one condition regarding a conditional column of the data structure, being a data table including columns and rows.

814 — The host device generates, for the data table, a row index column including row identifications each associated with a respective data record in a respective row of the data table.

815 — All data records and their associated row identifications in the data table are sorted according to data in the conditional column.

816 — The host device performs a binary search on the sorted data in the conditional column based on the at least one condition, to identify a list of rows of the data table and generate the bitmap including a list of bits identifying the list of rows.

820 — Read data from the memory device based on the read request.

822 — Read a plurality of pages in the memory device based on the read request.

830 — Filter the read data based on the bitmap to generate filtered data.
(A)

840 — Return the filtered data to the host device as a response to the read request.

Figure 8A

STRUCTURED DATA FILTERING IN MEMORY DEVICES

TECHNICAL FIELD

This application relates generally to reading data including, but not limited to, methods, systems, and non-transitory computer-readable media for reading data from a memory device by structured data filtering within the memory device.

BACKGROUND

Memory is applied in a computer system to store instructions and data. Particularly, the computer system relies on non-volatile memory to keep instructions and data stored thereon if the computer system is decoupled from a power source. Examples of the non-volatile memory include, but are not limited to, hard disk drives (HDDs) and solid-state drives (SSDs). SSDs store data in NAND memory, which continues to evolve with higher data density to meet enterprise and consumer demands for high capacity, high performance, and cost effective data storage.

A database management system (DBMS) running on a host device in a computer system stores data in structed format in a storage device (e.g. a SSD), allowing the DBMS to quickly retrieve and fulfill a user query, e.g. a structured query language (SQL) query requesting data from a table stored in the SSD. During a SQL query process, a usual table-scan takes a huge percentage of the query time, which is one of the major query-time bottlenecks. In most cases, DBMS has to read a lot of data from the SSD and performs data scanning and filtering in the host's own memory (e.g. a volatile memory) based on the query, and drops all un-related data. For example, for a table in a column database, the entire table usually has a large size, e.g. including 50 million records. Assuming one of the table columns has 4-byte integer type, the table column is stored in more than 3000 4-KB pages in a SSD. Reading all of these pages takes a lot of processor time and memory space of the host device, which makes data filtering desirable and beneficial to speed up the query process. In an existing computer system, the DBMS uses the host's processor and memory to cache in all pages of a column, scan the pages based on a query conditioned on this column, and drop all non-related data based on the scanning. When there are many queries being processed at the same time, the system requires a lot of cache space for scan and filter operations. As a DBMS table grows, the scan and filter operations quickly become the bottleneck of a query process.

As such, it would be beneficial to develop a mechanism for dropping non-related data early to save processor time, memory space, and data traffic on storage interface.

SUMMARY

Various embodiments of this application are directed to methods, systems, devices, and non-transitory computer-readable media for reading data from a memory device by structured data filtering within the memory device. The memory device is coupled to a host device in an electronic system (e.g. a computer system). In some embodiments, a database management system (DBMS) is running on the host device to store data to and retrieve data from tables in the memory device, e.g. based on a structured query language (SQL) query. In some embodiments, the host device obtains a subset of a plurality of columns of data (e.g., a single column, less than all of the columns) associated with a query, determines a bitmap based on the subset of columns, and sends the bitmap to the memory device. The memory device filters the plurality of columns of data based on the bitmap to provide filtered data in the plurality of columns of data. By these means, a bandwidth of an input/output interface between the host device and the memory device is efficiently utilized by avoiding communication of all of the plurality of columns of data to the host device in response to the query.

In one aspect, a method is implemented at a memory device coupled to a host device. The method includes receiving, from the host device, a read request for data in a data structure including a plurality of data records. The read request comprises a bitmap identifying a subset of data records in the plurality of data records. The method further includes reading data from the memory device based on the read request. The method further includes filtering the read data based on the bitmap to generate filtered data. The method further includes returning the filtered data to the host device in response to the read request.

In some embodiments, the bitmap is generated based on a query received by the host device. The data structure is a data table including columns and rows. The query comprises at least one condition with respect to a conditional column of the data table. Each of the subset of data records identified by the bitmap satisfies the at least one condition.

In some embodiments, the host device generates, for the data table, a row index column including row identifications each associated with a respective data record in a respective row of the data table. In some embodiments, the bitmap includes a list of bits identifying a list of rows of the data table, wherein the list of rows includes the subset of data records satisfying the at least one condition.

In some embodiments, all data records and their associated row identifications in the data table are sorted according to data in the conditional column. In some embodiments, the host device performs a binary search on the sorted data in the conditional column based on the at least one condition, to identify the list of rows of the data table and generate the bitmap.

In some embodiments, the read request further comprises at least one of: a starting read location with respect to logical block addressing (LBA), a length of LBA, a size of page head, or a size of data record. In some embodiments, the reading data from the memory device based on the read request comprises reading a plurality of pages in the memory device based on the read request.

In some embodiments, the filtering the read data based on the bitmap comprises: splitting data read from each of the plurality of pages into data items based on a size of data record indicated in the read request, the data items corresponding to data records in the data structure, filtering each of the data items, and packing all collected data items to generate the filtered data. In some embodiments, the filtering each of the data items comprises: determining, in the bitmap, a corresponding bit identifying the data item, collecting the data item in accordance with a determination that the corresponding bit is equal to one, and dropping the data item in accordance with a determination that the corresponding bit is equal to zero.

In some embodiments, the data structure is a data table including columns and rows. The bitmap is generated based on at least one condition with respect to a conditional column of the data table. Each of the collected data items corresponds to a data record comprising data in at least one column other than the conditional column of the data table.

In some embodiments, the filtering the read data based on the bitmap comprises: splitting data read from each of the plurality of pages into data items based on a size of data record indicated in the read request, obtaining a series of data items based on the splitting, the series of data items corresponding to data records in the data structure, checking a first data item in the series of data items based on a first bit in the bitmap. In some embodiments, the first data item is collected in accordance with a determination that the first bit is equal to one, and the first data item is dropped in accordance with a determination that the first bit is equal to zero. In some embodiments, the filtering the read data based on the bitmap further comprises: shifting the bitmap to identify next bit in the bitmap, checking next data item in the series of data items based on the next bit in the bitmap, repeating the steps of shifting and checking for subsequent bits in the bitmap until end of the bitmap, and packing all collected data items to generate the filtered data.

In some embodiments, the filtering the read data based on the bitmap comprises: splitting data read from each of the plurality of pages into data items based on a size of data record indicated in the read request, obtaining a plurality of series of data items based on the splitting, the plurality of series of data items comprising a first series of data items and a second series of data items, simultaneously checking a first data item in the first series of data items and a second data item in the second series of data items, based on a first bit and a second bit respectively in the bitmap. In some embodiments, the first data item is collected in accordance with a determination that the first bit is equal to one, and is dropped in accordance with a determination that the first bit is equal to zero, the second data item is collected in accordance with a determination that the second bit is equal to one, and is dropped in accordance with a determination that the second bit is equal to zero. In some embodiments, the filtering the read data based on the bitmap further comprises: shifting the bitmap to identify next bits of the first bit and the second bit in the bitmap, simultaneously checking next data items in the first and second series of data items based on the next bits respectively in the bitmap, repeating the steps of shifting and checking for subsequent bits in the bitmap until end of the bitmap, and packing all collected data items to generate the filtered data.

In some embodiments, the data table is a column-based table. In some embodiments, the data table is a row-based table with a fixed row size. In some embodiments, the data table is a row-based table with a variable-encoded row size.

Some implementations of this application include a memory device that includes a plurality of memory blocks, and a memory controller operable to execute instructions which when executed cause the memory controller to perform any of the above methods on a memory system (e.g., including one or more SSDs).

Some implementations of this application include an electronic system that includes a host device, and a memory device coupled to the host device and configured to perform any of the above methods on a memory system (e.g., including one or more SSDs).

Some implementations include a non-transitory computer readable storage medium storing one or more programs. The one or more programs include instructions, which when executed by one or more processors cause the processors to implement any of the above methods on a memory system (e.g., including one or more SSDs).

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 3 shows a representation of an example data table, in accordance with some embodiments of the present teaching.

FIGS. 8A and 8B show a flow diagram of an example method for reading data from a memory device by structured data filtering within the memory device, in accordance with some embodiments of the present teaching.

Like reference numerals refer to corresponding parts throughout the several views of the drawings.

DETAILED DESCRIPTION

Figure 1:
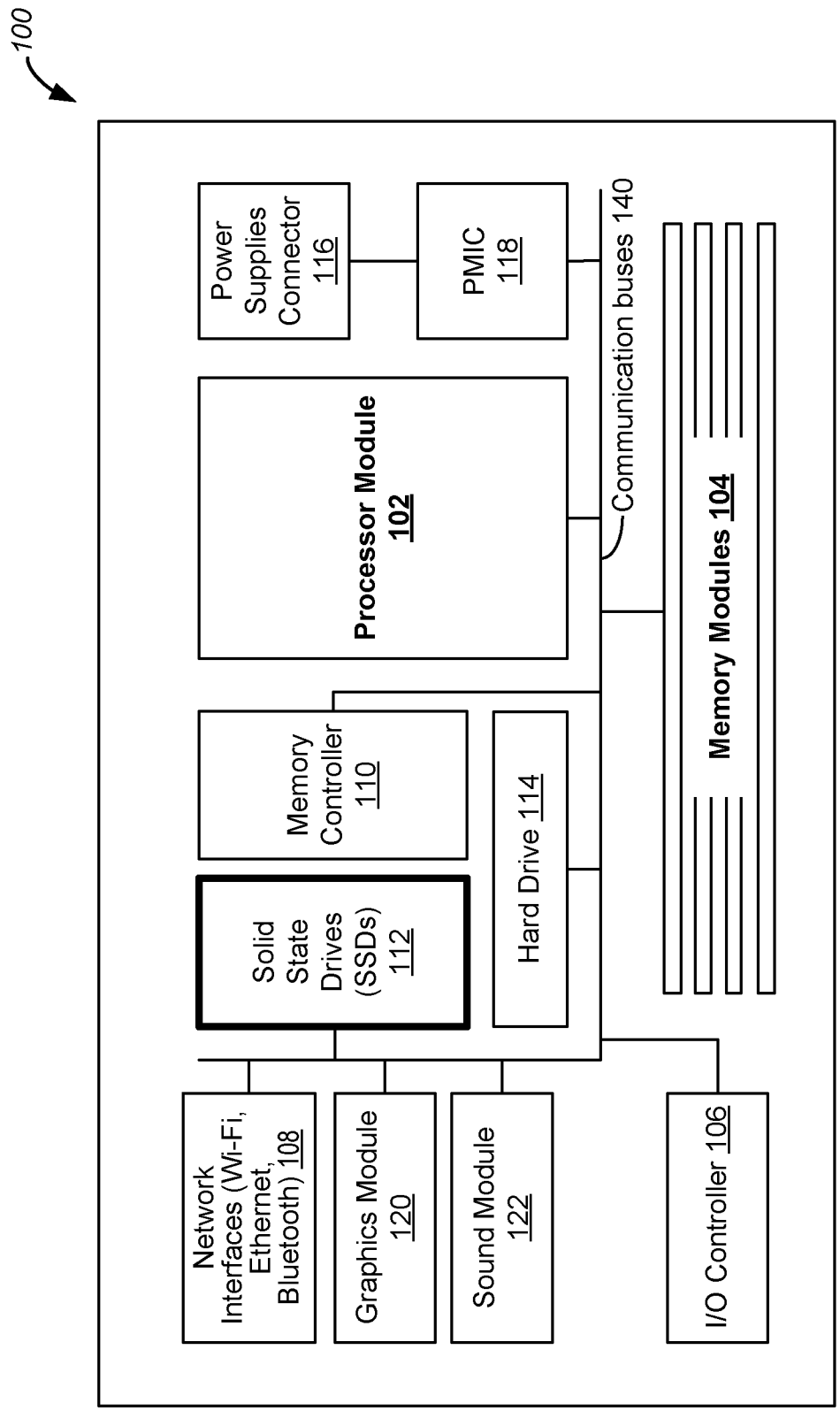
FIG. 1 is a block diagram of an example system module in a typical electronic system, in accordance with some embodiments of the present teaching.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on any types of electronic systems or devices with data storage capabilities.

A DBMS can serve as a query engine to read in table content for filtering data during a query process. It will induce a high cost when the DBMS or its associated field programmable gate array (FPGA) circuit needs to read in all pages from a table in a storage device, e.g. a nonvolatile memory express (NVMe) SSD, and scan each page during a query process. But before the DBMS reads these data, it does not know which part of these data is unnecessary. As such, some comparison is needed based on filtering criteria to decide whether read data are valid for a query.

Various embodiments of the present teaching are directed to methods, systems, devices, non-transitory computer-readable media for reading data from a memory device by structured data filtering within the memory device. One purpose of the embodiments is to help a DBMS on a host device to have un-interesting data records dropped before they reach the host device. In some examples for a column-based database, the un-interesting rows are dropped by SSD firmware. As such, all data reaching the host DBMS are valid and needed for the query. This reduces the amount of resources needed during a query process, e.g. host central processing unit (CPU) time, host memory and NVMe data traffic.

The DBMS query engine can offload the data filtering operation to SSD firmware with the help of some hardware at SSD. In some embodiments, a DBMS running at a host device sends a read request to SSD based on a query. The read request includes e.g. StartLBA, LBACount, pageHeadLength, and DataTypeLength (e.g. 8 for 64-bit unsigned integer), and one or more bitmaps. For a column-based table, a bitmap indicates which rows in the table is of interest to the query. The other non-interesting rows are thus dropped.

In some embodiments, the SSD includes a bitmap scan engine or bitmap filter engine, e.g. an IP block, which is part of a controller, processor, application-specific integrated circuit (ASIC) or system-on-chip (SoC) in the SSD. In some embodiments, the bitmap filter engine is configured to take in each 4-KB page, skip the pageHeadLength, and split the rest data into small units of DataTypeLength. For each unit, there is a corresponding bit in the bitmap. If the corresponding bit is 0, then the unit will be skipped; otherwise the unit will be appended to the output buffer to be returned to the DBMS. As such, instead of returning all content to the host device, the SSD filters and returns only the data that the DBMS needs according to the query, which saves a lot of time and memory for the host. As such, the host DBMS system does not need to have a big page cache to read in all pages, or perform scan and filtering operations in a query process, since most of the read data are dropped anyway usually. The query process will be more efficient as the un-queried data are dropped as early as possible in the query pipeline.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a track-pad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as dynamic random-access memory (DRAM), static random-access memory (SRAM), double data rate (DDR) DRAM, or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSDs 112, a hard disk drive (HDD) 114, power management integrated circuit (PMIC) 118, a graphics module 120, and a sound module 122. The memory controller 110 is configured to control communication between the processor module 102 and memory components, including the memory modules 104, in the electronic system. The SSDs 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs. The communication buses 140 also interconnect and control communications among various system components including components 110-122.

Further, one skilled in the art knows that other non-transitory computer readable storage media can be used, as new data storage technologies are developed for storing information in the non-transitory computer readable storage media in the memory modules 104 and in SSDs 112. These new non-transitory computer readable storage media include, but are not limited to, those manufactured from biological materials, nanowires, carbon nanotubes and individual molecules, even though the respective data storage technologies are currently under development and yet to be commercialized.

Figure 2:
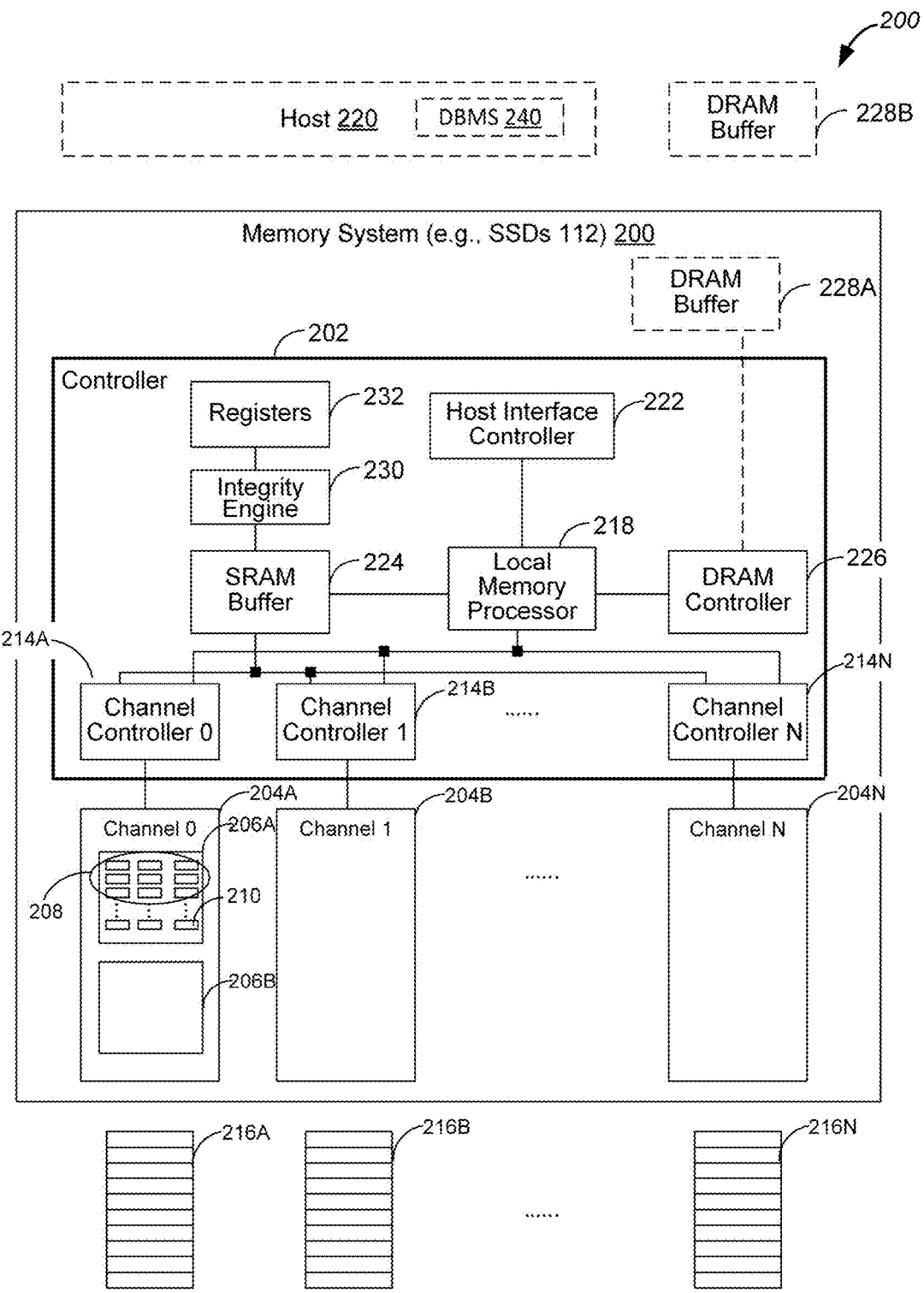
FIG. 2 is a block diagram of a memory system of an example electronic device having one or more memory access queues, in accordance with some embodiments of the present teaching.

FIG. 2 is a block diagram of a memory system 200 of an example electronic system having one or more memory access queues, in accordance with some embodiments. The memory system 200 is coupled to a host device 220 (e.g., a processor module 102 in FIG. 1) and configured to store instructions and data for an extended time, e.g., when the electronic system sleeps, hibernates, or is shut down. The host device 220 includes a DBMS 240. The host device 220 is configured to access the instructions and data stored in the memory system 200 and process the instructions and data to run an operating system and execute user applications. The memory system 200 further includes a memory controller 202 and a plurality of memory channels 204 (e.g., channels 204A, 204B, and 204N). Each memory channel 204 includes a plurality of memory cells. The memory controller 202 is configured to execute firmware level software to bridge the plurality of memory channels 204 to the host device 220. In some embodiments, a set of memory channels 204 forms a memory device (e.g., an SSD). In some embodiments, the memory system 200 includes one or more memory devices.

Each memory channel 204 includes on one or more memory packages. In an example, each memory package includes a memory die 206 (e.g., memory die 206A or 206B). In another example, each memory package has two or more memory dies 206. Each memory package includes a plurality of memory planes 208, and each memory plane 208 further includes a plurality of memory pages 210. Each memory page 210 includes an ordered set of memory cells, and each memory cell is identified by a respective physical address.

In some examples, a memory device includes 8 memory channels 204, and each memory channel 204 further includes 8 memory dies 206. Each memory die 206 includes 2 memory planes 208 or arrays. Each memory plane 208 further includes a plurality of memory pages 210. Each memory page 210 includes an ordered set of memory cells, and each memory cell is identified by a respective physical address.

In some embodiments, the memory system 200 includes a single-level cell (SLC) NAND flash memory chip, and each memory cell stores a single data bit. In some embodiments, the memory system 200 includes a multi-level cell (MLC) NAND flash memory chip, and each memory cell stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., channel controller 214A, 214B, or 214N) configured to control internal and external requests to access memory cells in the respective memory channel 204. In some embodiments, each memory package (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory system 200 corresponds to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the memory controller 202 further includes a memory processor 218, a host interface controller 222, an SRAM buffer 224, and a DRAM controller 226. The memory processor 218 accesses the plurality of memory channels 204 based on the one or more queues 216 of memory access requests. In some embodiments, the memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the memory processor 218 stores data to be written into, or read from, each memory block in the plurality of memory channels 204 in an SRAM buffer 224 of the memory controller 202. Alternatively, in some embodiments, the memory processor 218 stores data to be written into, or read from, each memory block in the plurality of memory channels 204 in a DRAM buffer 228 that is in memory system 200. Alternatively, in some embodiments, the memory processor 218 stores data to be written into, or read from, each memory block in the plurality of memory channels 204 in a DRAM buffer 228 that is main memory used by the processor module 102 (FIG. 1). The memory processor 218 of the memory controller 202 accesses the DRAM buffer 228 via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the memory system 200 includes an integrity engine 230 (e.g., an LDPC engine) and a registers 232 including a plurality of registers or SRAM cells or flip-flops and coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the memory processor 218. The integrity engine 230 is configured to verify data integrity for each coding block of the memory channels 204 using variable nodes and check nodes, and messages are exchanged between the variable and check nodes during the integrity check process. A subset of these messages is selected and temporarily stored in the registers 232 as variable node data or check node data.

In various embodiments of this application, the memory controller 202 is coupled to a local controller 280 disposed within a memory package, a memory die 206, or a memory plane 208. A memory system 200 includes a plurality of memory packages. In at least a subset of memory packages, each respective memory package includes a local controller 280 for monitoring and reporting validity conditions of its pages. The local controller 280 is configured to receive an inquiry for a validity condition of a page of the respective memory package from the memory controller 202, verify data integrity for each codeword in a subset of the page, and determine an error parameter of the page based on validity results of the subset of the page. The error parameter of the page is determined locally within the local controller 280 and reported to the memory controller 202 via an input/output (I/O) bus. By these means, the memory controller 202 only sends the inquiry for the validity condition of the page of the memory device and receives the error parameter via the I/O bus connecting to the memory channels 204, while no memory data needs to be communicated via the I/O bus.

In some embodiments, a DBMS stores data in a NVMe SSD in structed format. The disclosed methods are appliable to all structured DBMS table types, including but not limited to column-based tables and row-based tables. A DBMS stores data in a SSD such that the DBMS can later query and/or retrieve these data. Customers use DBMS to store and retrieve data efficiently and accurately, e.g. via SQL queries.

In some embodiments, a DBMS stores database in logical tables. Queries are made against one or more of these tables. Tables can be stored in row-format, or column-format. While traditional databases are stored by row, large or super large data are usually stored in column-format, to allow fast query.

In some embodiments, in a column store or column-based table, data are stored by column. Data in each column are aggregated and stored together. For example, in a table with user data in format of user(name, age, state), all names will be stored together, and all ages will be stored together. If the table will be queried using the age column in an everyday use case, the system can create an index based on the age column, which contains sorted age, and row-ID, e.g. as shown in Table I below.

TABLE I

| Age | Row-ID |
|-----|--------|
| 20  | 3      |
| 23  | 4      |
| 34  | 1      |
| 34  | 2      |
| 40  | 5      |

In this case, for a query such as "SELECT * FROM USER WHERE AGE >30," the DBMS can generate a bitmap with bits 1, 2 and 5 set to one, and the rest bits cleared to be zero. Then the DBMS can issue such read command to the SSD to read the corresponding page. The page will be split into units each having 20-bytes user-name data. The SSD will scan these units based on the bitmap, and only return units 1, 2 and 5 in a pack, but skip the remaining units. In some embodiments, the bitmap is included in an extended read command or request transmitted from the DBMS to the SSD during a read cycle. In some embodiments, the splitting, scanning and packing operations are performed quickly by a bitmap scan block or bitmap filter block implemented in the SSD.

FIG. 3 shows a representation of an example data table 300, in accordance with some embodiments of the present teaching. In some embodiments, the data table 300 is stored in a non-volatile storage device (e.g. SSD), which may be implemented as the memory system 200 in FIG. 2. A DBMS (e.g., DBMS 240 in FIG. 2) running on a host device (e.g., the host device 220 in FIG. 2) coupled to the non-volatile storage device can store data to and retrieve data from the data table 300.

In the example shown in FIG. 3, the data table 300 is a stock market trade table in format of: trade_table (symbol char(20), timestamp int, shares int, cost int). In some examples, a stock exchange platform has 10 million records generated per day. If the database is a column-stored table, the data in the "symbol" column will all be stored together in a logically related series of pages, e.g. in LBA 100-3400. Similarly, for example, all data in the "shares" column are stored in LBA 9000-10000; and all data in the "cost" column are stored in LBA 15000-16000, as shown in FIG. 3.

Figure 4A:
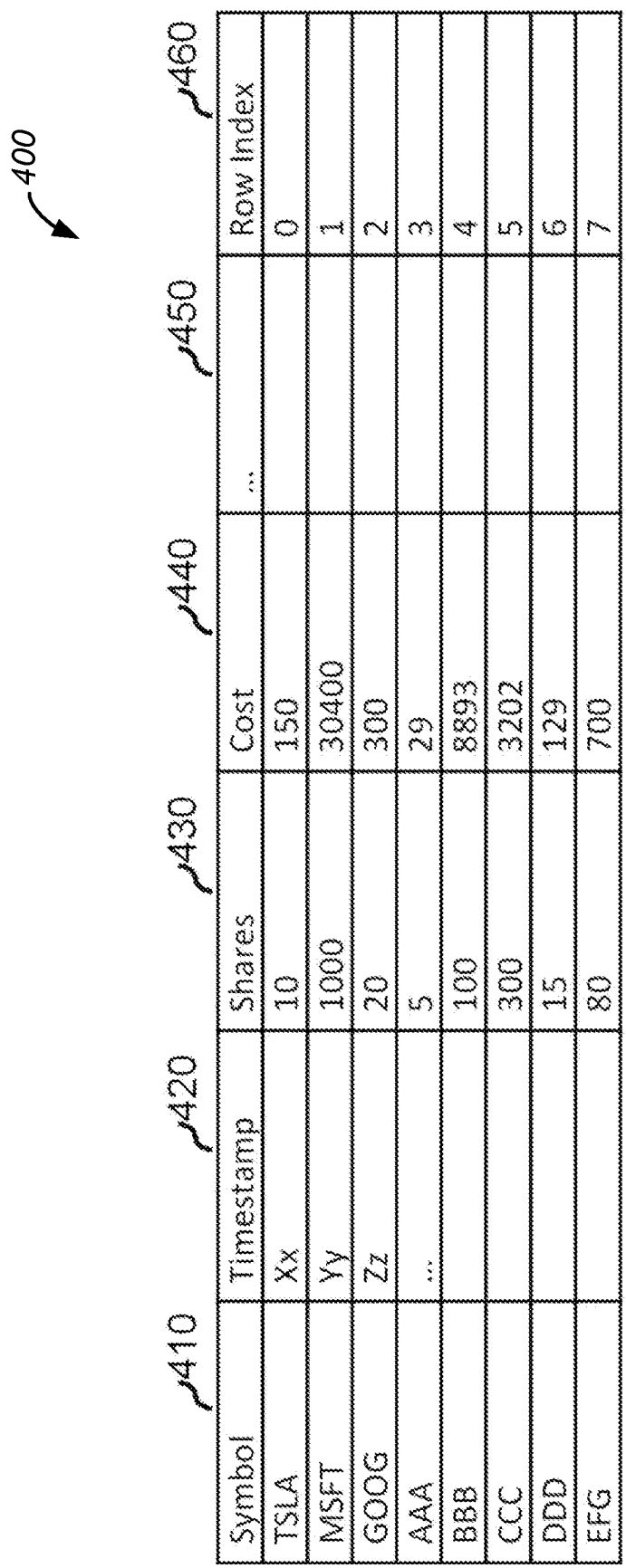
FIG. 4A is a logic view of an example data table, in accordance with some embodiments of the present teaching.

FIG. 4A is a logic view of an example data table 400, in accordance with some embodiments of the present teaching. In some embodiments, the data table 400 is stored in a non-volatile storage device (e.g. SSD), which may be implemented as the memory system 200 in FIG. 2. A DBMS (e.g., DBMS 240 in FIG. 2) running on a host device (e.g., the host device 220 in FIG. 2) coupled to the non-volatile storage device can store data to and retrieve data from the data table 300.

As shown in FIG. 4A, the data table 400 includes a symbol column 410, a timestamp column 420, a shares column 430, a cost column 440, a row index column 460, and optionally other columns 450. In some embodiments, after receiving a query from a user, the DBMS generates a read request to retrieve data from one or more rows of the data table 400, under a condition of one or more columns of the data table 400 based on the query. In some embodiments, the row index column 460 includes row indices for the rows of the data table 400. Based on a row index, the SSD can quickly locate a corresponding row in the memory blocks and pages, e.g. based on an offset relative to the starting location of the data table.

In one example, the DBMS receives a query of "select symbol, cost from trade_table where cost >1000." Since the data records are typically collected as trade happens, the "cost" of each trade varies all the time. As such, it is not easy for DBMS to know which pages to read and which pages not to read without any additional information from the data table 400. In some embodiments, the DBMS retrieves all pages which contain "cost," then filters out the entries based on the query (i.e. only entries with cost >1000 are valid), and generates a valid bitmap indicating which rows are valid according to the query.

The filtering criteria based on the above query is cost >1000. Since there are 8 records in the data table 400, a bitmap stream generated for the data table 400 will be BMP="0 1 0 0 1 1 0 0," from the least significant bit (LSB) to the most significant bit (MSB). In this bitmap, 0 indicates a corresponding data record (a corresponding row) is invalid and not meeting the criteria, 1 indicates a corresponding data record (a corresponding row) is valid and meeting the criteria, and will be packed in an output buffer. In this case, most data are dropped by the SSD, and only a fraction of data are returned to the DBMS. This saves a lot of data traffic time between SSD and DBMS, and saves a lot of cache and scan resources for the DBMS.

Figure 4B:
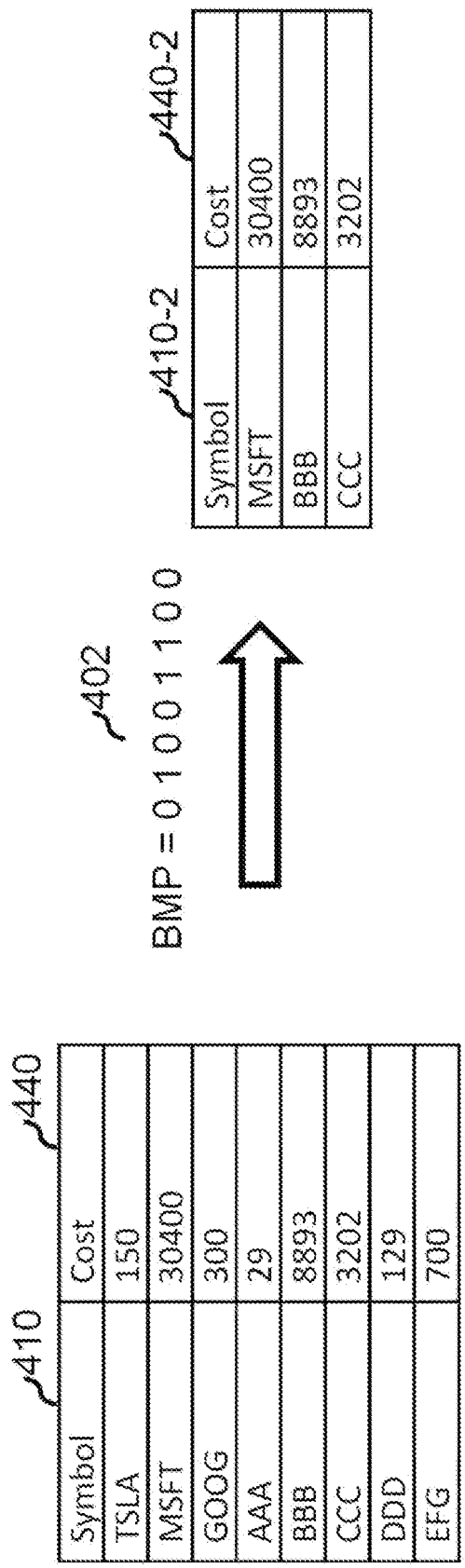
FIG. 4B shows an exemplary process for filtering data records in a table based on a bitmap, in accordance with some embodiments of the present teaching.

In some embodiments, after the SSD obtains the BMP and other information in the read request, the SSD reads all other columns' LBAs, and apply this bitmap to the other LBAs. For example, the SSD reads the pages which contain the symbol column 410, the cost column 440, and gets the data in the columns 410, 440 as shown in FIG. 4B. Then, the SSD applies the bitmap 402 BMP=0 1 0 0 1 1 0 0 to generate a result data table including filtered columns 410-2, 440-2 (shown in FIG. 4B) to be returned to the DBMS. In some embodiments, the filtered column 440-2 is generated when the bitmap is generated, since the cost column 440 is the column used in the filtering criteria of the query.

In some embodiments, if the cost column 440 includes millions of data records, the DBMS needs a lot of host memory to cache the page for scanning and filtering operations, based on the query including a filtering criteria regarding the cost column 440. In addition, a single query can generate a lot of read-page traffic, and the DBMS can receive many such queries simultaneously, which makes the read traffic and the memory required to fulfill all these SQL queries substantially heavy and large. The host memory and the interface between the host and the SSD could easily become the bottleneck in a query process.

To further improve query efficient, an index table can be created for a filter column, or any column that is frequently used as a filtering criteria in queries. A column is called a filter column or conditional column when a query is requesting data based on a filtering criteria applied on the column. In some embodiments, an index table is created for a column, if the column is a filter column with a daily or weekly frequency higher than a predetermined threshold. In some embodiments, an index table is created for a column, if the column is expected to be a filter column with a daily or weekly frequency higher than a predetermined threshold in a future time period.

Figure 5:
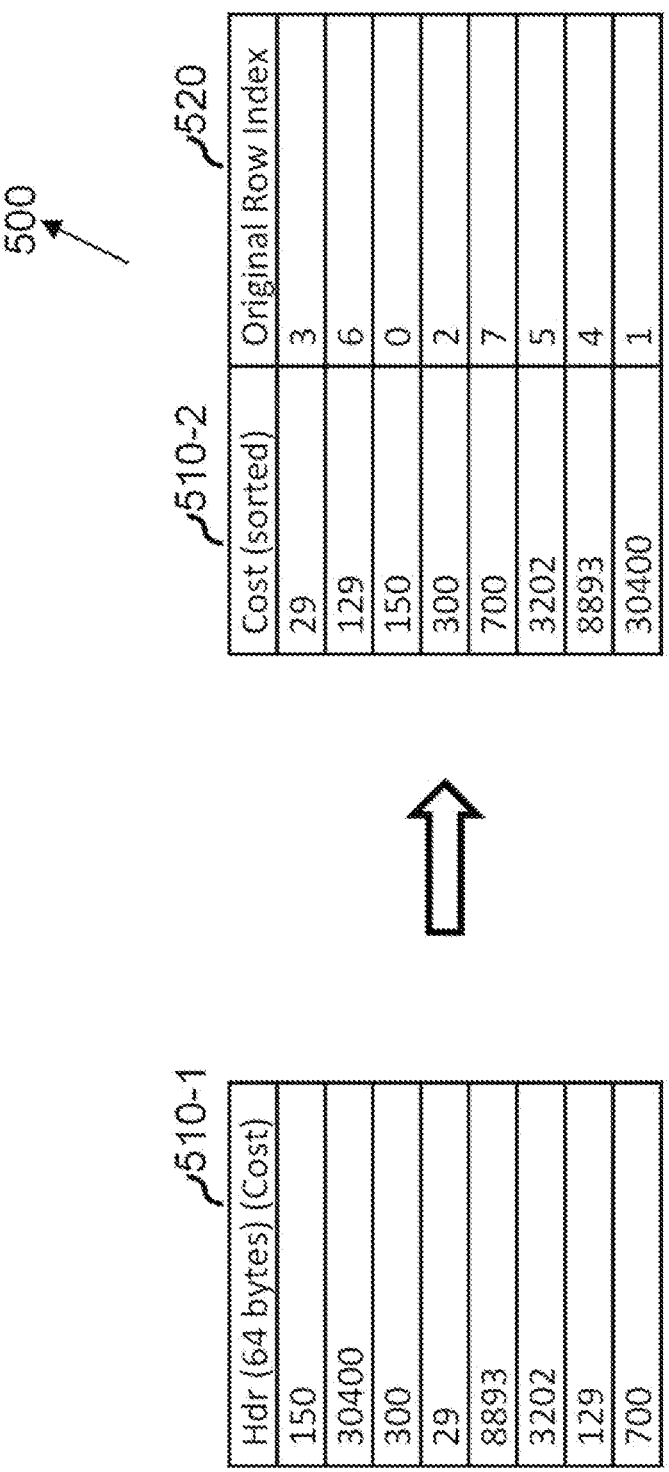
FIG. 5 shows an example process for generating an index table, in accordance with some embodiments of the present teaching.

FIG. 5 shows an example process for generating an index table 500, in accordance with some embodiments of the present teaching. In some embodiments, the index table 500 is generated for the data table 300 in FIG. 3 and/or the data table 400 in FIG. 4A, and is stored in the DBMS and/or the SSD.

In the example shown in FIG. 5, the cost column 510-1 (e.g. the cost column 440 in FIG. 4A) is stored in a page in the SSD with 64 bytes header. The index table 500 in this example includes both a sorted version of the cost column (the sorted cost column 510-2), and a column 520 including original row index (from the row index 460 in FIG. 4A).

As shown in FIG. 5, the sorted cost column 510-2 includes cost entries sorted or ranked from low to high. The column 520 includes original row index for each row corresponding to the sorted cost entries in the sorted cost column 510-2. That is, when the cost entries are sorted, the sortation is expanded at least to the original row index column. In some embodiments, the index table 500 includes one or more other columns as well. In some embodiments, another index table is created by sorting a column other than the cost column, together with a correspondingly sorted original row index column.

In some embodiments, a DBMS stores the index table 500 in a local memory in the host device. Based on a query including a filtering criteria on the sorted cost column 510-2 (e.g. cost >1000 or cost <500), the DBMS can quickly identify the valid row indices for rows meeting the filtering criteria, e.g. using a binary search across the sorted cost column 510-2. This saves lots of CPU time at the host device, especially when the total quantity of rows is huge, e.g. millions. In the example in FIG. 4, the DBMS can quickly identify the valid row indices 5, 4 and 1, and generate a bitmap indicating these row indices. The bitmap will be sent by the DBMS to the SSD, e.g. as part of a read command, to read data records (e.g. other columns in the valid row indices 5, 4 and 1) from the data table stored in the SSD.

In some embodiments, the index table 500 is stored in the SSD. The DBMS first loads the index table 500 from the SSD into a local memory of the host device, after receiving a query including a filtering criteria on the sorted cost column 510-2. Then the DBMS identifies the valid row indices in the sorted cost column 510-2 based on the query, e.g. using a binary search or any other searching method, and generates the bitmap accordingly.

In some embodiments, the DBMS can further create statistics of the index table 500 to split data into ranges. For example, the DBMS can use the statistics to roughly know from which page to start scanning, given a filtering criteria on the sorted cost column 510-2 (e.g. cost >1000 or cost <500). Once the DBMS locates that page, the SSD only needs to scan and return data records starting from that page, saving time and resources on other pages containing invalid data records (with cost not meeting the filtering criteria), during retrieving the index table 500 before generating the bitmap and/or during reading data from the entire data table (e.g. the data table 400) after receiving the bitmap.

In some embodiments, the bitmap can be compressed before being sent from the DBMS to the memory device. In some examples, there are many (e.g. thousands or millions of) data records in the data table, and the bitmap is identifying only a small portion (e.g. less than 10) of the data records to be valid. Then, there will be many zeros but few ones in the bitmap, which can be substantially compressed before being sent the SSD, and decompressed after being received by the SSD. In some examples, the DBMS only needs to indicate the relative locations (e.g. in terms of row index or starting LBA) of the valid records.

Once a bitmap is created, it can be used to speed up the query process significantly. In some embodiments, the bitmap is received by the SSD and used to filter read data by a bitmap filter engine. In some embodiments, the bitmap filter engine is an IP block on an ASIC processor or a SoC in the SSD. In some embodiments, the bitmap filter engine is part of a memory controller (e.g. the memory controller 202 in FIG. 2) in the SSD.

In some embodiments, the bitmap filter engine is controlled by firmware via a read request, e.g. an extended read command. The SSD receives, from the host DBMS, the extended read command, which includes information about the reading process, e.g. start-lba indicating a starting LBA location, length-lba indicating a length of LBA for the reading process, page-head-size indicating a size of the page header, data-entry-size indicating a size of each data entry or data record, and a bitmap identifying the valid row indices of the data table determined based on a query.

Based on the information included in the extended read command, the firmware reads corresponding pages, e.g. starting from the start-lba and reading for the length of length-lba. After a page is read, it is not directly returned to the host DBMS. Instead, the read page is sent to the bitmap filter engine.

In some embodiments, the bitmap filter engine splits a page into each data record or data entry based on the data-entry-size, and checks each data record based on the bitmap. The bitmap filter engine skips those invalid data records according to the bitmap, and collects the valid data records according to the bitmap. Then, the bitmap filter engine packs all valid data records into a return buffer or output buffer, which contains only those valid data without any invalid data according to the bitmap.

Figure 6:
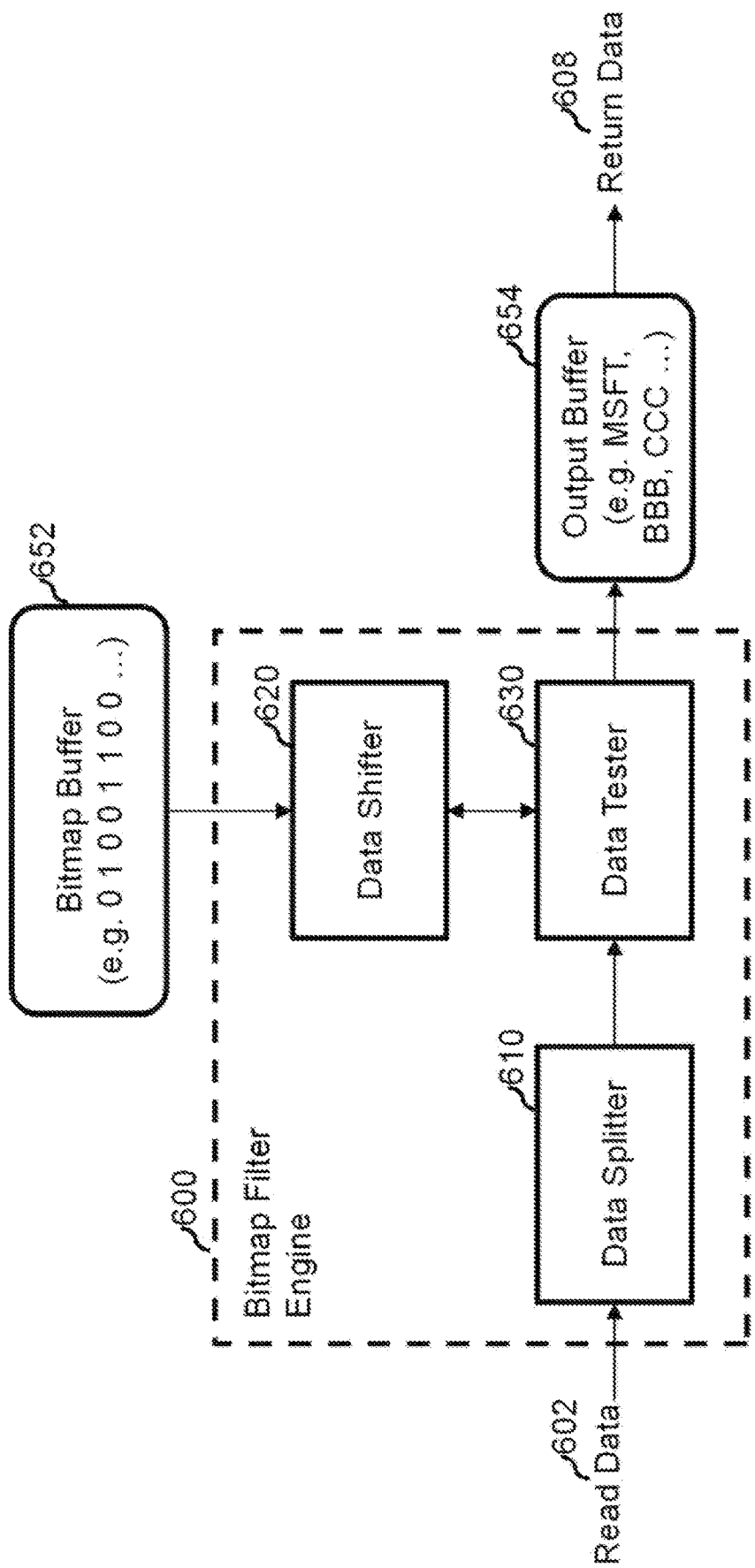
FIG. 6 is a block diagram of an example bitmap filter engine in a memory device, in accordance with some embodiments of the present teaching.

FIG. 6 is a block diagram of an example bitmap filter engine 600 in a memory device, e.g. the memory system 200 in FIG. 2, in accordance with some embodiments of the present teaching. In some embodiments, the bitmap filter engine 600 is implemented in an ASIC processor or a controller (e.g. the memory controller 202 in FIG. 2) of the memory device (e.g. SSD).

As shown in FIG. 6, the bitmap filter engine 600 includes a data splitter 610, a data shifter 620 and a data tester 630. In the example shown in FIG. 6, the read data 602 is read from the symbol column 410 of the data table 400 in FIG. 4, based on a read request according to a query.

The data splitter 610 is configured to split the read data 602 into a series of data records, each data record being an entry having the data-entry-size. In this example, since not all data entries in the symbol column 410 are needed by the query, the bitmap filter engine 600 will identify the valid data entries from the read data 602 based on a bitmap in the read request. In some embodiments, the bitmap includes a series of bits, each bit corresponding to a respective one of the series of data entries, such that each bit can indicate whether a corresponding data entry is valid or invalid according to a filtering criteria determined based on the query.

In the example shown in FIG. 6, the bitmap is BMP="0 1 0 0 1 1 0 0 . . . ", which is cached in a bitmap buffer 652. In some embodiments, the bitmap buffer 652 is part of the SRAM buffer 224 or part of the memory channels 204 in FIG. 2. The bitmap buffer 652 stores the bitmap as a queue, which can retrieved by the data shifter 620. In some embodiments, the data shifter 620 reads the bitmap bit-by-bit, e.g. by shifting the bitmap one bit per time.

The data tester 630 in this example is configured to check each data entry generated by the data splitter 610, based on a corresponding bit in the bitmap read from the bitmap buffer 652. In some embodiments, the data tester 630 instructs the data shifter 620 to read a first bit from the bitmap to check a first data entry corresponding to the first bit, and determines whether the first bit is equal to one or zero. In some examples, the data tester 630 collects the first data entry and sends the first data entry to an output buffer 654, in accordance with a determination that the first bit is equal to one. In some examples, the data tester 630 drops the first data entry, in accordance with a determination that the first bit is equal to zero.

Then, the data tester 630 instructs the data shifter 620 to read the next bit (a second bit) in the bitmap, e.g. by shifting the bitmap to identify the next bit. The data tester 630 checks whether the next data entry (a second data entry) corresponding to the next bit (the second bit) is valid, by determining whether the next bit (the second bit) is equal to one or zero. In some examples, the data tester 630 collects the second data entry and sends the second data entry to the output buffer 654, in accordance with a determination that the second bit is equal to one. In some examples, the data tester 630 drops the second data entry, in accordance with a determination that the second bit is equal to zero.

The data tester 630 performs similar operations as described above for subsequent data entries corresponding to subsequent bits in the bitmap, until the end of the bitmap and/or the end of the series of data entries generated by the data splitter 610. As such, all valid data entries determined by the data tester 630 are packed into the output buffer 654. In this example, the data entries "MSFT," "BBB," "CCC," are valid data entries in the symbol column 410 according to the bitmap BMP="0 1 0 0 1 1 0 0 . . . ."

In some embodiments, the symbol column 410 has more valid data entries corresponding to more bits in the bitmap. In some embodiments, the output buffer 654 is part of the SRAM buffer 224 or part of the memory channels 204 in FIG. 2. The output buffer 654 stores data output by the bitmap filter engine 600 and to be returned to the DBMS. After the output buffer 654 is full or the data tester 630 finishes data packing, the memory device (e.g. SSD) sends the return data 608 in the output buffer 654 to the DBMS in response to the read request.

Figure 7:
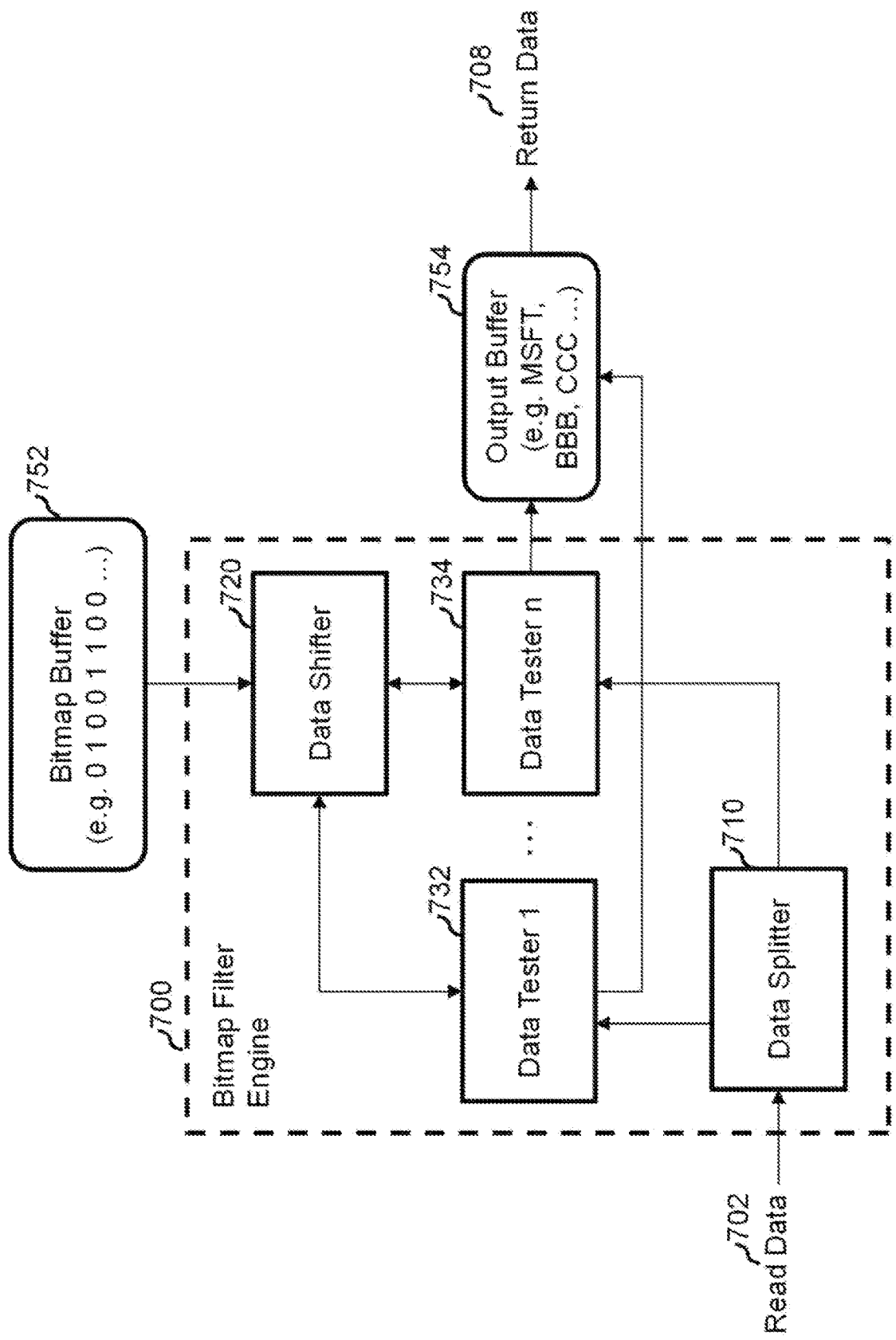
FIG. 7 is a block diagram of another example bitmap filter engine in a memory device, in accordance with some embodiments of the present teaching.

FIG. 7 is a block diagram of another example bitmap filter engine 700 in a memory device, e.g. the memory system 200 in FIG. 2, in accordance with some embodiments of the present teaching. In some embodiments, the bitmap filter engine 700 is implemented in an ASIC processor or a controller (e.g. the memory controller 202 in FIG. 2) of the memory device (e.g. SSD).

As shown in FIG. 7, the bitmap filter engine 700 includes a data splitter 710, a data shifter 720 and multiple data testers, data tester 1 732 to data tester n 734. In the example shown in FIG. 7, the read data 702 is read from the symbol column 410 of the data table 400 in FIG. 4, based on a read request according to a query.

The data splitter 710 and the data shifter 720 function in similar manners to the data splitter 610 and the data shifter 620 in FIG. 6, respectively. Different from the bitmap filter engine 600 including a single data tester, the multiple data testers 732, 734 work in parallel to speed up the bitmap filtering process.

In the example shown in FIG. 7, the data splitter 710 is configured to split the read data 702 into a series of data entries, each entry having the data-entry-size in the read request. In this example, since not all data entries in the symbol column 410 are needed by the query, the bitmap filter engine 700 will identify the valid data entries from the read data 702 based on a bitmap in the read request. In some embodiments, the bitmap includes a series of bits, each bit corresponding to a respective one of the series of data entries, such that each bit can indicate whether a corresponding data entry is valid or invalid according to a filtering criteria determined based on the query.

In the example shown in FIG. 7, the bitmap is BMP="0 1 0 0 1 1 0 0 . . . ", which is cached in a bitmap buffer 752, which may be part of the SRAM buffer 224 or part of the memory channels 204 in FIG. 2. The bitmap buffer 752 stores the bitmap as a queue, which can retrieved by the data shifter 720. In some embodiments, the data shifter 720 reads the bitmap bit-by-bit, e.g. by shifting the bitmap one bit per time. In some embodiments, the data shifter 720 reads the bitmap by shifting the bitmap multiple bits per time.

The data splitter 710 in this examples further divides the series of data entries (split from the read data 702) into multiple sub-series of data entries, and sends the multiple sub-series of data entries to the multiple data testers 732, 734, respectively. Each of the multiple data testers 732, 734 in this example is configured to check each data entry in the received sub-series of data entries, based on a corresponding bit in the bitmap read from the bitmap buffer 752.

In some embodiments, the data tester 1 732 instructs the data shifter 720 to read a first bit from the bitmap to check a first data entry corresponding to the first bit, and determines whether the first bit is equal to one or zero. In some examples, the data tester 1 732 collects the first data entry and sends the first data entry to an output buffer 754, in accordance with a determination that the first bit is equal to one. In some examples, the data tester 1 732 drops the first data entry, in accordance with a determination that the first bit is equal to zero. Similarly, the data tester n 734 instructs the data shifter 720 to read a second bit from the bitmap to check a second data entry corresponding to the second bit, and determines whether the second bit is equal to one or zero. In some examples, the data tester n 734 collects the second data entry and sends the second data entry to the output buffer 754, in accordance with a determination that the second bit is equal to one. In some examples, the data tester n 734 drops the second data entry, in accordance with a determination that the second bit is equal to zero.

Then, the multiple data testers 732, 734 instruct the data shifter 720 to read the next bits (e.g. a third bit and a fourth bit) in the bitmap, e.g. by shifting the bitmap to identify the next bits. Each of the multiple data testers 732, 734 tests or checks whether the next data entry (e.g. a third data entry or a fourth data entry) corresponding to the next bit (e.g. the third bit or the fourth bit) is valid, by determining whether the next bit is equal to one or zero. In some examples, the next data entry is collected and sent to the output buffer 754, in accordance with a determination that the next bit is equal to one. In some examples, the next data entry is dropped, in accordance with a determination that the next bit is equal to zero.

The multiple data testers 732, 734 perform similar operations as described above for subsequent data entries corresponding to subsequent bits in the bitmap, until the end of the bitmap and/or the end of the series of data entries generated by the data splitter 710. As such, all valid data entries determined by the multiple data testers 732, 734 are packed into the output buffer 754. In this example, the data entries "MSFT," "BBB," "CCC," are valid data entries in the symbol column 410 according to the bitmap BMP="0 1 0 0 1 1 0 0 . . . ." In some embodiments, the symbol column 410 has more valid data entries corresponding to more bits in the bitmap. In some embodiments, the output buffer 754 is part of the SRAM buffer 224 or part of the memory channels 204 in FIG. 2. The output buffer 754 stores data output by the bitmap filter engine 700 and to be returned to the DBMS. After the output buffer 754 is full or the multiple data testers 732, 734 finish data packing, the memory device (e.g. SSD) sends the return data 708 in the output buffer 754 to the DBMS in response to the read request. In some embodiments, the read data 602, 702 include thousands of pages, but the return data 608, 708 are packed into less than 10 pages.

In some embodiments, for a row store database or row-based data table, the number of rows in the table is usually smaller compared to a column database table. In some embodiments, similar methods as described above for column-based data tables can be used to scan and drop the non-interesting entries.

A row-based table can be classified as fixed row size tables and variable-encoded row size tables. For example, for a row-based table with fixed-row size, the above described data filtering operations in an SSD can be used to filter out the columns which is not interesting to the query, based on a bitmap. This can significantly improve the data return efficiency to the host, and save host CPU time and buffer space.

For fixed row-size data records, data scan can greatly benefit from the above bitmap filtering engine. In the row-based table, a B+ index of a column contains the sorted column and row index of each record. In some embodiments, a DBMS creates a bitmap of rows to be returned based on the B+ index and a filtering criteria in a query. The bitmap is sent to the firmware and bitmap filter engine (e.g. IP block) of the storage device (e.g. SSD) for read operation, where only interesting or valid entries meeting the filtering criteria, rather than all entries in the page, are returned to the DBMS.

In some embodiments, data stored in the SSD are encrypted. Then through key authentication, once firmware on the SSD and DBMS on the host set up a trusted channel, the host can send over the decryption key via a secure channel or via key-encrypted-key. The firmware decrypts the data decrypt key before feeding read data to the bitmap filter engine block, and encrypts the final output from the bitmap filter engine using the same key or a different key before returning data to DBMS.

Figure 8B:
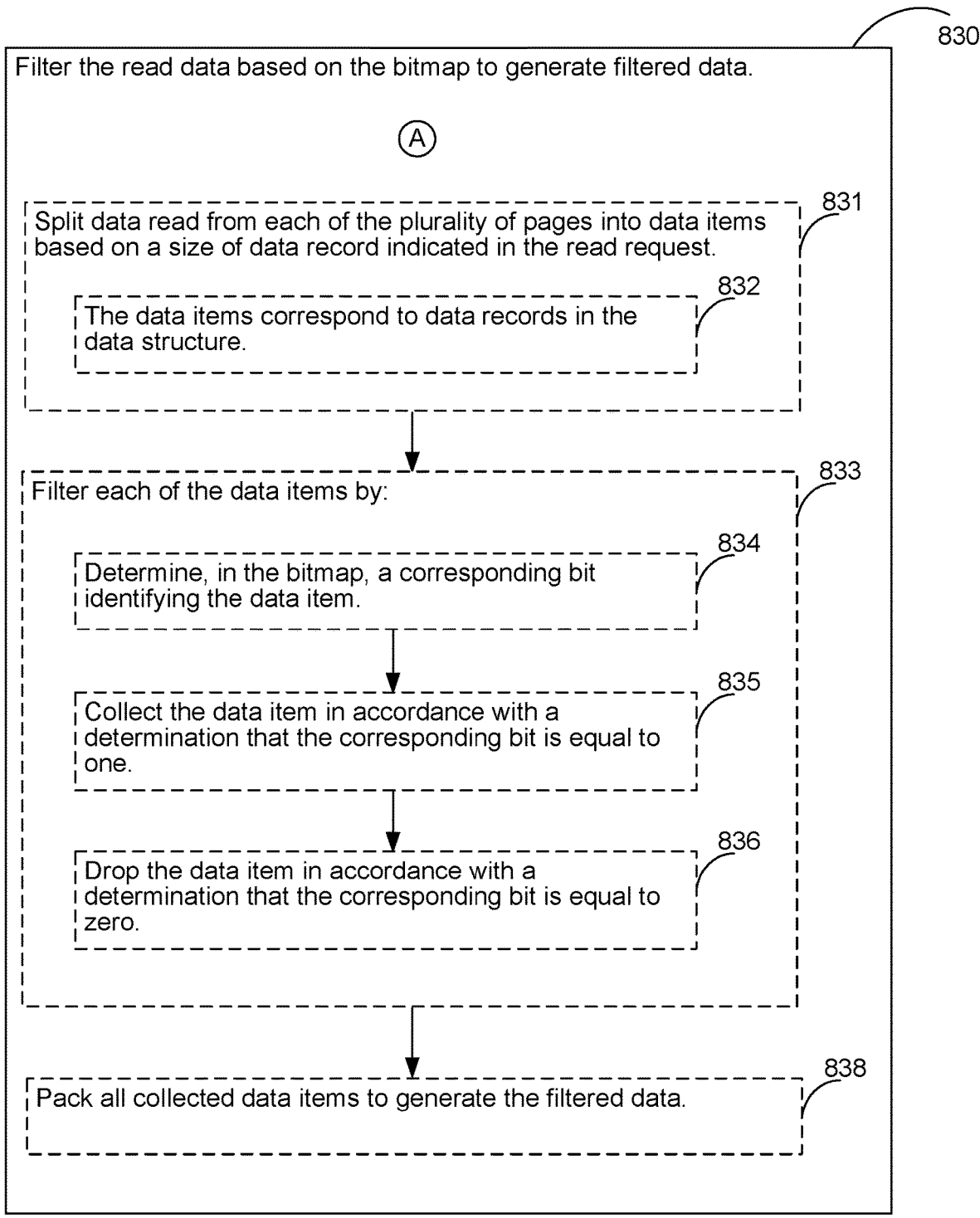

FIGS. 8A and 8B show a flow diagram of an example method 800 for reading data from a memory device by structured data filtering within the memory device, in accordance with some embodiments of the present teaching. In some embodiments, the method 800 is performed by a memory device implemented as the memory system 200 (FIG. 2).

In some embodiments, the memory device receives (operation 810), from a host device (e.g. the host device 220) coupled to the memory device, a read request for data in a data structure that includes a plurality of data records. In some embodiments, the read request comprises (operation 811) a bitmap identifying a subset of data records in the plurality of data records. The memory device reads (operation 820) data from the memory device (e.g. from the plurality of memory channels 204 in the memory device) based on the read request. The memory device filters (operation 830) the read data based on the bitmap to generate filtered data, e.g. using the bitmap filter engine 600 or the bitmap filter engine 700 in the memory device. The memory device returns (operation 840) the filtered data to the host device in response to the read request.

In some embodiments, the read request further comprises (operation 812) at least one of: a starting read location with respect to logical block addressing (LBA); a length of LBA; a size of page head; or a size of data record. In some embodiments, the bitmap is generated (operation 813) based on a query comprising at least one condition regarding a conditional column of the data structure, being a data table including columns and rows. In some embodiments, the host device generates (operation 814), for the data table, a row index column including row identifications each associated with a respective data record in a respective row of the data table. In some embodiments, all data records and their associated row identifications in the data table are sorted (operation 815) according to data in the conditional column. In some embodiments, the host device performs (operation 816) a binary search on the sorted data in the conditional column based on the at least one condition, to identify a list of rows of the data table and generate the bitmap including a list of bits identifying the list of rows.

In some embodiments, the memory device reads (operation 822) a plurality of pages in the memory device based on the read request. In addition, the memory device splits (operation 831) data read from each of the plurality of pages into data items based on a size of data record indicated in the read request. In some embodiments, the data items correspond (operation 832) to data records in the data structure. In some embodiments, the memory device filters (operation 833) each of the data items. In some embodiments, the filtering at operation 833 comprises: determining (operation 834), in the bitmap, a corresponding bit identifying the data item, collecting (operation 835) the data item in accordance with a determination that the corresponding bit is equal to one, and dropping (operation 836) the data item in accordance with a determination that the corresponding bit is equal to zero. The memory device then packs (operation 838) all collected data items to generate the filtered data.

It should be understood that the particular order in which the operations in FIGS. 8A and 8B have been described are merely exemplary and are not intended to indicate that the described order is the only order in which the operations could be performed. Additionally, it should be noted that details of other processes described above with respect to FIGS. 1-7 are also applicable in an analogous manner to method 800 described above with respect to FIGS. 8A and 8B. For brevity, these details are not repeated here.

Memory is also used to store instructions and data associated with the method 800, and includes high-speed random-access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 800. Alternatively, in some embodiments, the electronic device implements the method 800 at least partially based on an ASIC. The memory system of the electronic device includes an SSD in a data center or a client device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method implemented at a memory device that is coupled to a host device, the method comprising:
    receiving, from a database management system (DBMS) running on the host device, a read request for data in a data structure, wherein:
        the data structure includes a plurality of data records, and
        the read request includes a page head length, a data type length, and a bitmap identifying a subset of data records in the plurality of data records;
    reading a plurality of pages of data from the memory device based on the read request, including:
        skipping the page head length; and
        splitting a remainder of the plurality of pages of data into multiple units of data items according to the data type length;
    generating, by the memory device, a first subset of the read data by filtering the read data based on the bitmap, the memory device distinct from the DBMS and distinct from the host device; and
    returning the first subset of the read data to the host device in response to the read request without a remainder of the read data.

2. The method of claim 1, wherein:
    the bitmap is generated based on a query received by the host device;
    the data structure is a data table including columns and rows;
    the query comprises at least one condition with respect to a conditional column of the data table;
    each of the subset of data records identified by the bitmap satisfies the at least one condition;

the host device generates, for the data table, a row index column including row identifications each associated with a respective data record in a respective row of the data table;

the bitmap includes a list of bits identifying a list of rows of the data table, wherein the list of rows includes the subset of data records satisfying the at least one condition;

all data records and their associated row identifications in the data table are sorted according to data in the conditional column; and the host device performs a binary search on the data in the conditional column based on the at least one condition, to identify the list of rows of the data table and generate the bitmap.

3. The method of claim 1, wherein the read request further comprises at least one of:
a starting read location with respect to logical block addressing (LBA);
a length of LBA; and
a size of data record.

4. The method of claim 1, wherein the data items correspond to data records in the data structure, and filtering the read data based on the bitmap comprises:
filtering each of the data items by:
determining, in the bitmap, a corresponding bit identifying the data item,
collecting the data item in accordance with a determination that the corresponding bit is equal to one, and dropping the data item in accordance with a determination that the corresponding bit is equal to zero; and
packing all collected data items to generate filtered data including the first subset of the read data.

5. The method of claim 4, wherein:
the data structure is a data table including columns and rows;
the bitmap is generated based on at least one condition with respect to a conditional column of the data table; and
each of the collected data items corresponds to a data record comprising data in at least one column other than the conditional column of the data table.

6. The method of claim 1, wherein filtering the read data based on the bitmap comprises:
obtaining a series of data items based on the splitting, wherein the series of data items correspond to data records in the data structure;
checking a first data item in the series of data items based on a first bit in the bitmap, wherein:
the first data item is collected in accordance with a determination that the first bit is equal to one, and
the first data item is dropped in accordance with a determination that the first bit is equal to zero;
shifting the bitmap to identify a next bit in the bitmap;
checking a next data item in the series of data items based on the next bit in the bitmap;
repeating the steps of shifting and checking for subsequent bits in the bitmap until an end of the bitmap; and
packing all collected data items to generate filtered data including the first subset of the read data.

7. The method of claim 1, wherein the filtering the read data based on the bitmap comprises:
obtaining a plurality of series of data items based on the splitting, wherein the plurality of series of data items comprises a first series of data items and a second series of data items;
simultaneously checking a first data item in the first series of data items and a second data item in the second series of data items, based on a first bit and a second bit respectively in the bitmap, wherein:
the first data item is collected in accordance with a determination that the first bit is equal to one, and is dropped in accordance with a determination that the first bit is equal to zero, and
the second data item is collected in accordance with a determination that the second bit is equal to one, and is dropped in accordance with a determination that the second bit is equal to zero;
shifting the bitmap to identify next bits of the first bit and the second bit in the bitmap;
simultaneously checking next data items in the first and second series of data items based on the next bits respectively in the bitmap;
repeating the steps of shifting and checking for subsequent bits in the bitmap until an end of the bitmap; and
packing all collected data items to generate filtered data including the first subset of the read data.

8. The method of claim 1, wherein the data structure is a data table including columns and rows, and the data table is a column-based table.

9. The method of claim 1, wherein the data structure is a data table including columns and rows, and the data table is a row-based table with a fixed row size.

10. The method of claim 1, wherein the data structure is a data table including columns and rows, and the data table is a row-based table with a variable-encoded row size.

11. A memory device, comprising:
a plurality of memory blocks; and
a memory controller operable to execute instructions which when executed cause the memory controller to perform operations comprising:
receiving, from a database management system (DBMS) running on a host device coupled to the memory device, a read request for data in a data structure, wherein:
the data structure includes a plurality of data records; and
the read request includes a page head length, a data type length, and a bitmap identifying a subset of data records in the plurality of data records;
reading a plurality of pages of data from the plurality of memory blocks based on the read request, including:
skipping the page head length; and
splitting a remainder of the plurality of pages of data into multiple units of data items according to the data type length;
generating, by the memory device, a first subset of the read data by filtering the read data based on the bitmap, the memory device distinct from the DBMS and distinct from the host device; and
returning the first subset of the read data to the host device in response to the read request without a remainder of the read data.

12. The memory device of claim 11, wherein:
the bitmap is generated based on a query received by the host device;
the data structure is a data table including columns and rows;
the query comprises at least one condition with respect to a conditional column of the data table;
each of the subset of data records identified by the bitmap satisfies the at least one condition;

the host device generates, for the data table, a row index column including row identifications each associated with a respective data record in a respective row of the data table;

the bitmap includes a list of bits identifying a list of rows of the data table, wherein the list of rows includes the subset of data records satisfying the at least one condition;

all data records and their associated row identifications in the data table are sorted according to data in the conditional column; and the host device performs a binary search on the data in the conditional column based on the at least one condition, to identify the list of rows of the data table and generate the bitmap.

13. The memory device of claim 11, wherein the data items correspond to data records in the data structure, and filtering the read data based on the bitmap comprises:

filtering each of the data items by:
determining, in the bitmap, a corresponding bit identifying the data item,
collecting the data item in accordance with a determination that the corresponding bit is equal to one, and
dropping the data item in accordance with a determination that the corresponding bit is equal to zero; and
packing all collected data items to generate filtered data including the first subset of the read data.

14. An electronic system, comprising:
a host device; and
a memory device coupled to the host device and configured to perform operations comprising:
receiving, from a database management system (DBMS) running on the host device, a read request for data in a data structure, wherein:
the data structure includes a plurality of data records; and
the read request includes a page head length, a data type length, and a bitmap identifying a subset of data records in the plurality of data records,
reading a plurality of pages of data from the memory device based on the read request, including:
skipping the page head length; and
splitting a remainder of the plurality of pages of data into multiple units of data items according to the data type length:
generating, by the memory device, a first subset of the read data by filtering the read data based on the bitmap, the memory device distinct from the DBMS and distinct from the host device; and
returning the first subset of the read data to the host device in response to the read request without a remainder of the read data.

15. The electronic system of claim 14, wherein the data items correspond to data records in the data structure, and filtering the read data based on the bitmap comprises:
filtering each of the data items by:
determining, in the bitmap, a corresponding bit identifying the data item,
collecting the data item in accordance with a determination that the corresponding bit is equal to one, and
dropping the data item in accordance with a determination that the corresponding bit is equal to zero; and
packing all collected data items to generate filtered data including the first subset of the read data.

16. The method of claim 1, wherein:
the read request further includes a size of data record; and
filtering the read data further includes identifying locations of the subset of data records based on the size of the data record and the bitmap.

17. The method of claim 1, further comprising:
receiving a query including a condition;
retrieving data based on the condition; and
determining the bitmap indicating a subset of rows that are valid based on the query, wherein the read request is generated to include the bitmap in response to the query.

18. The memory device of claim 11, wherein:
the read request further includes a size of data record; and
filtering the read data further includes identifying locations of the subset of data records based on the size of the data record and the bitmap.

19. The memory device of claim 11, the operations further comprising:
receiving a query including a condition;
retrieving data based on the condition; and
determining the bitmap indicating a subset of rows that are valid based on the query, wherein the read request is generated to include the bitmap in response to the query.

20. The electronic system of claim 14, wherein filtering the read data based on the bitmap comprises:
obtaining a series of data items based on the splitting, wherein the series of data items correspond to data records in the data structure;
checking a first data item in the series of data items based on a first bit in the bitmap, wherein:
the first data item is collected in accordance with a determination that the first bit is equal to one, and
the first data item is dropped in accordance with a determination that the first bit is equal to zero;
shifting the bitmap to identify a next bit in the bitmap;
checking a next data item in the series of data items based on the next bit in the bitmap;
repeating the steps of shifting and checking for subsequent bits in the bitmap until an end of the bitmap; and
packing all collected data items to generate filtered data including the first subset of the read data.

* * * * *